United States Patent [19]

Pardo et al.

[11] 4,398,249

[45] Aug. 9, 1983

[54] PROCESS AND APPARATUS FOR CONVERTING A SOURCE PROGRAM INTO AN OBJECT PROGRAM

[76] Inventors: Rene K. Pardo; Remy Landau, both of 12 Romney Rd., Downsview, Ontario, both of Canada, M3H 1H2

[21] Appl. No.: 63,185

[22] Filed: Aug. 12, 1970

[51] Int. Cl.³ .............................................. G06F 15/06
[52] U.S. Cl. ................................................... 364/300
[58] Field of Search .................. 340/172.5, 7 B, 16 R; 235/150; 444/1; 364/300

Primary Examiner—Edward J. Wise

[57] ABSTRACT

A process and apparatus (compiler program) carried out on a digital computer for converting a source program into an object program. The source program is entered into a first storage area of a computer. The symbolic source program is preferably first codified into computer executable code by the compiler program. The compiler program then examines each formula to determine whether it has been defined. If the first formula has been defined, it is removed from the first storage area; placed in a second storage area; and marked as being defined. if the first formula examined has not been defined, it is retained in the first storage area. The compiler program repeats this process for each formula in the first storage area. After the formulas in the first storage area have been examined, the compiler program determines whether any formulas have been added to the second storage area. If not, the process is stopped, indicating some error in programming. If so, the compiler program repeats the examination of the individual formulas still retained in the first storage area. The compiler program repeats the process until all formulas have been defined; added to the second storage area; and marked as being defined. The content of the second storage area is an object program which is executable by the computer.

36 Claims, 2 Drawing Figures

PROCESS AND APPARATUS FOR CONVERTING A SOURCE PROGRAM INTO AN OBJECT PROGRAM

BACKGROUND OF THE INVENTION

1. Field of the Invention

This invention relates to a process and apparatus carried out on a digital computer for converting a source program into an object program. Such processes are known as compiler programs or simply as compilers. The reader is directed to the DEFINITIONS set out at the end of this specification for the intended meaning of certain terms used in this description.

The value of data processing for solving business problems is well known. However, computers are complex machines, which must be programmed in order to solve these problems. Thus, industry has had to hire teams of highly skilled programmers, who with the assistance of company specialists having problems to be solved (e.g. accountants, economists, purchasing agents, managers etc.), write the programs for the computer to execute. The problems to be solved by each specialist are peculiar to his specialty, and unfortunately, are often very difficult for a programmer to understand. The programmer, on the other hand, works in a specialized language quite unfamiliar to the ordinary businessman. The businesman understands his problem and how to solve it manually, but the difficulty has been in translating the manual process of solution into a form conducive to a computer resolution. Such problems in communication between businessmen and programmers have greatly increased the costs and complexities of computer utilization.

2. Description of the Prior Art

Prior to this invention, a programmer was constrained to follow an order of writing his program that was logical for the computer to follow. In other words, the programmer was forced to concern himself with the order in which the formulas of his program were executed by the computer. This is a very difficult and tedious task.

SUMMARY OF THE INVENTION

It is therefore an object of this invention to provide a compiler process and apparatus which permit a businessman, who has had no previous association with computers, to write his own source programs for data processing applications after a short period of instruction.

It is also an object of this invention to permit a businessman, once his problem has been properly identified and organized, to write source programs in a manner and in a sequence that are logical to him for solving the problem, without regard to the logical order of the program required for the computer to execute it. The compiler process and apparatus of this invention carry out the function of converting the source program to an object program, with the formulas presented in an order which maintains the relationship and logic of the original source program, while permitting the computer to execute the object program. In other words, the complex job of figuring out the order in which the program has to be presented to the computer is done by the compiler, leaving the source program writing as a familiar and relatively simple job for the businessman to accomplish.

According to one aspect of this invention, sufficient of the formulas of the source program are examined in a storage area of the computer to determine at least one such formula that has been defined. This step of examination is repeated for sufficient of the formulas not yet determined as being defined to determine at least one additional one of such formulas that has been defined. The repeated step of examination is continued as many times as required to determine that all of the formulas of the source program have been defined. Subsequent to a given formula having been so determined as being defined, the order in which it is to be executed by the computer in relation to execution of the other formulas is indicated.

Preferably, a first formula of the source program is examined in a first storage area of a computer to determine whether it has been defined. If so, it is removed from the first storage area, placed in a second storage area of the computer and marked in storage as being defined. If the first examined formula has not been defined, it is retained in the first storage area. A second formula of the source program is then examined in the first storage area, and if it has been defined, the formula is transferred to the next available position in the second storage area and marked in storage as being defined. If the second examined formula has not been defined, it is retained in the first storage area. These steps are repeated for each of the formulas of the source program and when all formulas have been examined for the first time, it is determined whether any formulas have been added to the second storage area. If not, the process is stopped, indicating some error in the programming. However, if at least one formula has been defined and placed in the second storage area, the steps of examining, removing, marking and retaining formulas are repeated for each formula still retained in the first storage area. This process is repeated as many times as are necessary to define all formulas, remove them from the first storage area and place them in a new order in the second storage area. The formulas are then in an order executable by the computer, while maintaining the intended program logic.

The apparatus for carrying out this invention is a program for a digital computer to carry out the process outlined above.

This invention has been successfully practiced on a general electric 400 Series Time Sharing Computer.

BRIEF DESCRIPTION OF THE DRAWINGS

A preferred embodiment of this invention will now be described, by way of example, with reference to the accompanying drawings in which.

DESCRIPTION OF THE PREFERRED EMBODIMENT

Many computer solvable problems can be represented in the form of tables, business forms being one of the most common examples. Table I below is given as a very simple example wherein it is desired to know the total revenue derived from the sale of specific quantities of two separate items, each having individual unit prices.

TABLE I

|  | REVENUE | QUANTITY SOLD | PRICE/ITEM |
|---|---|---|---|
| ITEM 1 | QUANTITY * PRICE/ITEM | INPUT DATA | 50¢ |
| ITEM 2 | QUANTITY * PRICE/ITEM | INPUT DATA | 100¢ |
| TOTAL | REVENUE ITEM 1 + REVENUE ITEM 2 | | |

It is to be noted that the Table is written in the form of an array of three horizontal lines (rows) and three vertical columns, the intersection of any line and column defining a box, which locates a specific piece of data or information.

For purposes of identifying each box in the array, a convention is given in the Table II below:

TABLE II

|  | COL. 1 | COL. 2 | COL. 3 |
|---|---|---|---|
| LINE 1 | BOX 101 | BOX 102 | BOX 103 |
| LINE 2 | BOX 201 | BOX 202 | BOX 203 |
| LINE 3 | BOX 301 | BOX 302 | BOX 303 |

Each box of a table can be referenced uniquely by means of its line and column number. It can be seen from Table II that the two right most digits of a box number refer to the column in which the box is located, whereas the left most digit of the box numbers refers to the line in which it is located. Thus, 302 refers to the box in line 3, column 2. These numbers are defined as box numbers, locations or addresses in the table.

We can therefore consider our simplified example in the form of the Table III below:

TABLE III

|  | 1 | 2 | 3 |
|---|---|---|---|
| 1 | 102 * 103 | INPUT | K.50 |
| 2 | 202 * 203 | INPUT | K1.00 |
| 3 | 101 + 102 | | |

It is to be noted that the letter K is used to denote a constant so as not to confuse it with a box number. Thus, box 101 contains the product of the contents of box 102 and box 103. Box 102 is to contain data which is to be retrieved from some external data storage device such as a deck of cards. Box 103 contains the constant 0.5. A box can contain constant or variable data, the result of a calculation for that box or nothing.

The problem as represented in Table III can now be written as a source as follows:

| 1 | 102 * 103; |
|---|---|
| 2 | INPUT; |
| 3 | K.50; |
| 4 | 202 * 203; |
| 5 | INPUT; |
| 6 | K1.00; |
| 7 | 101 + 201; |

It can be seen that the first formula of the source program is the one contained in box 101; the second formula is in box 102; the third formula is in box 103; etc. The semicolons at the end of each line of the source program represent the end of a formula contained in a given box.

Figure 1:
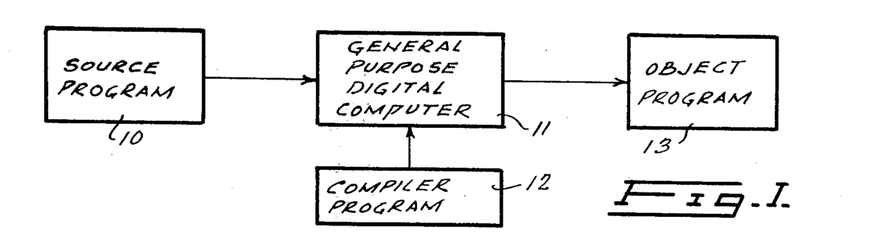
FIG. 1 is a simplified block diagram showing the general organization of a compiler program function.

This source program must be converted into an object program by a compiler program process. To carry out the compiler program process, the source program must be made accessable to a storage area of the computer. For example, the source program can take the form of a deck of cards that is placed in the reader of the computer. Referring to FIG. 1, a source program 10 is symbolically shown as entered into the input of a general purpose computer 11. Control is given to a compiler program 12, which acts on the source program 10 to produce an object program 13, which is in computer executable form. The object program 13 can be left in a storage area of the computer or it can be punched out on cards for subsequent use. In any case, the solution of the problem to be solved can be carried out on a digital computer such as computer 11, using the object program 13, in a conventional manner.

Before a computer can execute a program, each formula of the program has to be codified into a computer executable code. This function is carried out by the compiler program 12, which analyzes the source program 10 and generates therefrom machine executable codes. Each formula of the source program is broken down into individual instruction steps such as storage, retrieval, calculation, etc. When the compiler program 12 has converted every formula of the source program 10, it leaves in a storage area of the computer a file known as the raw coding file, containing computer executable instructions. This step of generating raw coding is conventional, and using our simple example, the coding could typically appear as shown in Table IV below:

TABLE IV

| INSTRUCTION REFERENCE NUMBER | CODE | MEANING |
|---|---|---|
| 1 | 1200102 | Find the content of BOX 102 |
| 2 | 1500103 | Multiply by the content of BOX 103 |
| 3 | 1100101 | Store the result in BOX 101 |
| 4 | 4200102 | Get from storage INPUT 102 |
| 5 | 1100102 | Store the INPUT data in BOX 102 |
| 6 | 2200003 | Find the constant .5 |
| 7 | 1100103 | Store this constant in BOX 103 |
| 8 | 1200202 | Find the content of BOX 202 |
| 9 | 1500203 | Multiply by the content of BOX 203 |
| 10 | 1100201 | Store the result in BOX 201 |
| 11 | 4200202 | Get from storage INPUT 202 |
| 12 | 1100202 | Store the INPUT data in BOX 202 |
| 13 | 2200004 | Find the constant 1.00 |
| 14 | 1100203 | Store this constant in BOX 203 |

TABLE IV-continued

| INSTRUCTION REFERENCE NUMBER | CODE | MEANING |
| --- | --- | --- |
| 15 | 1200101 | Find the content of BOX 101 |
| 16 | 1300201 | Add the content of BOX 201 |
| 17 | 1100301 | Store the result in BOX 301 |

However, if the computer 11 were to execute the instructions in the sequence presented in the raw codings, it would yield incorrect results. Referring to Table IV, it can be seen that instruction steps 4 to 7 have to be executed by the computer before instruction steps 1 to 3, since instruction steps 4 to 7 provide information that is essential to carry out the calculation of instruction steps 1 to 3. Similarly, instruction steps 11 to 14 have to be executed before instruction steps 8 to 10. If the compiler program 12 did nothing more than follow the sequence of the source program 10, it would be necessary for the person writing the source program to reorganize the source program formulas in the proper order for the computer to yield correct results.

This is exactly what this invention avoids. When large and complex business forms and tables are involved, which may have been developed over the years by a corporation, one cannot change the logical order of a table just because one wants to solve the problem by computer. To do so could seriously impair the company procedures.

According to our invention, the problem previously facing the programmer of having to organize his material to suit a computer rather than himself is overcome by the process (algorithm) in the compiler program 12. This program examines the formulas located in each BOX in turn and alters their order of presentation to the computer so that it can execute the program. This resequencing is accomplished without requiring the source programmer to change his source coding presentation and without losing the meaning and logic of the source program. Since prior art programming techniques force the programmer to concern himself with the sequence in which the instructions were executed by the computer, a compiler program did not alter the sequence in which the programmer's instructions were written, because to do so could have drastically changed both the meaning and the logic of the program.

Figure 2:
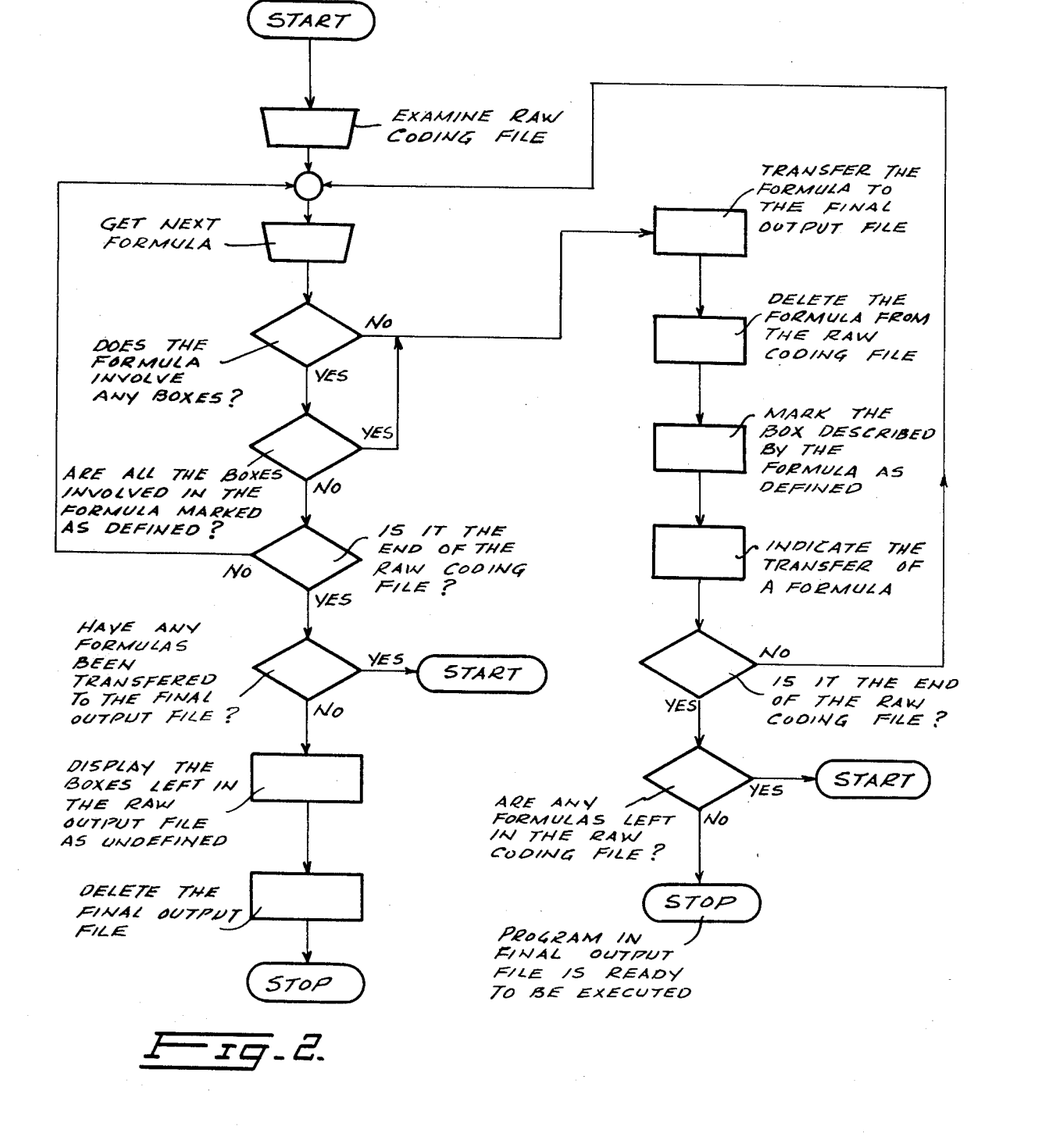
FIG. 2 is a flow chart showing the algorithm of the compiler program according to this invention.

The algorithm or key process of the compiler program 12 will now be described with reference to the flowchart of FIG. 2. For ease of description, the algorithm will be illustrated with reference to the source program set out, since the raw coding of Table IV follows the exact sequence of the source coding. It is important to note that at the beginning of the process, the content of all BOXES (the formulas contained therein) are assumed to be undefined.

The raw coding file in a first storage area of the computer is first examined from the top. Therefore, the first formula 102 * 103, describing the content of BOX 101 is examined. Since this formula involves BOXES 102 and 103 in order to completely define it, these BOXES are examined to determine whether the formulas contained therein are defined. Since BOXES 102 and 103 are undefined at this stage of the process, BOX 101 is considered to be undefined.

This is not the end of the raw coding file, so the next formula INPUT in BOX 102 is examined and the same process carried out. This time, however, the formula INPUT is defined, because the result of another formula is not required for the computer to perform the function INPUT. Therefore, this formula is placed in a second storage area such as the final output file of the computer, and deleted from the first storage location of the raw coding file. Box 102, described by the formula INPUT, is marked in storage as being defined, and an indication is given of the transfer of a formula to the second storage area.

Again, since this is not the end of the raw coding file, the third formula K0.50 in BOX 103 is examined. The same procedure is followed because this formula is defined. Therefore, the formula is transferred to the next available position in the second storage area and deleted from the raw coding file. BOX 103 is marked in storage as being defined.

Since the next formula involves formulas 202 and 203, which are still undefined, BOX 201, which contains this formula also remains undefined. The next two formulas INPUT and K1.00 are defined and are therefore transferred to the next available positions in the second storage area and deleted from the raw coding file. BOXES 202 and 203 are then marked in storage as being defined. The last formula 101+201 requires the result of formulas in BOXES 101 and 201, which are still undefined. Therefore, BOX 301 remains undefined.

The end of the raw coding file has now been reached, and since some formulas have been transferred to the second storage area, and because some formulas remain in the first storage area of the raw coding file, this file is again examined from the top. The first formula 102 * 103 in BOX 101 is defined, because the formulas of both BOXES 102 and 103 have been defined. Therefore, formula 102 * 103 is transferred to the second storage area and deleted from the first storage area of the raw coding file, with BOX 101 being marked in storage as defined. Similarly, the next formula 202 * 203 can be transferred and deleted from the raw coding file, with BOX 201 being marked in storage as defined. Finally, formula 101+201 in BOX 301 is defined. Since this is the end of the raw coding file, and there are no formulas left in this file, the full program is now in the second storage area ready to be executed by the computer using standard programming techniques. The content of the second storage area or final output file appears in the following order:

| | WITH RESULTS STORED IN |
| --- | --- |
| INPUT; | 102 |
| K.50; | 103 |
| INPUT; | 202 |
| K1.00; | 203 |
| 102 * 103; | 101 |
| 202 * 203; | 201 |
| 101 + 201; | 301 |

It is noted that only two passes were required through the raw coding file in order to transfer all of the formulas to the final output file. In most applications, many more such passes are required, since we would be dealing with larger and more complex tables. For example, using two digits for columns and three digits for lines, up to 99 columns and to 999 lines are permissible in a given table. However, the above-described algorithm is valid whether the table contains only a few boxes or several thousand boxes.

The process stops when either:
(a) the raw coding file is emptied, in which case the final output file can be submitted for execution; or
(b) when no formulas have been transferred during a given pass. Such an occurrence implies a logical error in the source program. In this case, an appropriate diagnostic routine is applied.

It should be pointed out that the resequencing carried out by the compiler program of this invention is not at all related to conventional formula compilation. It is common to code the individual instruction steps of a given formula in a different order from that presented in a source program. This is because certain conventions are adhered to with respect to the order that individual mathematical operations are carried out. For example, what is inside brackets is evaluated first; exponentiation is done before multiplication, division or subtraction, etc. In our process, we consider an entire program and we resequence complete individual formulas, as well as the individual instruction steps of a given formula, where necessary. This resequencing of complete formulas was not done in prior art compiler programs, because to do so could have altered the entire intended logic of the source program.

It should also be understood that the source program can be entered into the first storage area either in whole or in part. For example, the complete source program could be entered into the first storage area before the compiler program begins its processing. Or the source program could be entered into the first storage area a formula at a time or an individual instruction step of a given formula at a time. The compiler program could carry out its process on each instruction step or formula as it is entered into the first storage area of the computer.

The writing of a source program to be compiled according to the embodiment of this invention just described, makes use of such symbols as 101, 102, etc., for box numbers and a semicolon (;) to terminate individual formulas. The following mathematical symbols are used:
+ addition
− subtraction
* multiplication
/ division
+ exponentiation (to the power of)

It is noted that the term INPUT has been used to identify the content of certain boxes. This term is essentially an indication to the computer to retrieve a particular item of data from some external source such as a magnetic tape, rather than from the table itself.

PERMISSIBLE MODIFICATIONS TO THE PREFERRED EMBODIMENT

The embodiment of the invention described above translated the source program into raw coding prior to the application of the algorithm process. However, it is also possible to carry out the resequencing of the formulas prior to translating the source program into raw coding, while still using the same algorithm. However, care must be taken to identify the storage area of each examined formula of the source program, if the algorithm is to be carried out on the source program rather than on the coded version thereof. Such a modification, although perfectly feasible, is slower and less efficient than the preferred embodiment described above.

The preferred embodiment also examines each formula in the order presented by the source program. The nature of this invention permits one to compile in a random order starting anywhere in the source program. Once again, care must be taken, if the order of the source program is not followed, to identify the storage area of each examined formula. The indication of the order of execution of the defined formulas can be done after each formula or a number of formulas has been examined or at the end of each pass.

The actual execution of the program by the computer can be carried out after all of the formulas have been defined and their order of execution has been indicated, as described in the preferred embodiment. It is also possible, according to this invention, to carry out the execution of individual formulas as they become defined. For example, as soon as sufficient formulas have been examined to determine at least one of them that has been defined, the order of such defined formula(s) can be indicated, and if desired, such formula(s) can then be executed by the computer prior to continuing the examination of further formulas. In other words, if a formula has been determined to be defined upon examination, the order in which it can be executed can also be determined, and the timing of its actual execution becomes discretionary. A given formula can be executed as soon as it has been defined or a number of formulas can be executed after they have been defined.

Another modification to this invention would be to examine each formula of the source program or the raw coding program as before, but during the first pass, determining only if the individual formulas examined require the results of other formulas for their own definition, without determining whether such other formulas have themselves been defined. Therefore, during the first pass, all formulas requiring the results of other formulas would be retained in the first storage area, whereas all formulas not requiring the result of other formulas, would be placed in the second storage area. The raw coding file would then contain only formulas requiring the results from other formulas. During the second and subsequent passes, such formulas would be examined to determine whether they are defined as is done in each pass of the preferred embodiment.

Although somewhat more complicated, formulas determined to be defined in a given pass can be re-examined in subsequent passes. It is important only thay they be identified as having been defined previously.

In the preferred embodiment, defined formulas are transferred to the second storage area and undefined formulas are retained in the first storage area. It is clear that this process can be readily reversed. Undefined formulas would be transferred to a second storage area and re-examined there. Newly defined formulas would be transferred back to the first storage area or to a new storage area or even retained in the second storage area, while still undefined formulas would be transferred to further storage areas for re-examination.

Still a further variation would be to transfer defined and undefined formulas from the first storage area to new and separate storage areas, thereafter clearing the first storage area. Undefined areas would be re-examined in their new storage area, with newly defined formulas being transferred to their separate storage area and the process repeated for still undefined formulas.

It is important to note that it is not necessary to move defined formulas from their original storage area, it being necessary only to identify that they have been defined and to indicate the order in which they are to be executed by the computer. This identification and indication can be readily accomplished by use of well known techniques such as indexing.

Our invention has been described with reference to the writing of source programs using tables having lines and columns defining boxes at their intersection. It should be understood, however, that the invention is also applicable to source programs written without the use of tables and boxes. For example, the source program can be written in a conventional manner by listing the individual formulas and giving each of them some unique identification so that their storage areas can be identified.

From the above, it can be seen that, according to our invention, the tedious and error-prone task of organizing the sequence of presentation of instructions and calculations to a computer is not necessary for the person writting a source program. It is the compiler program that reorganizes the information presented by the source program, without altering the meaning or the logic of that information. Thus, the programmer is freed to present his source program in the form that best resembles his original problem. This freedom from source program reorganization permits more rapid programming, correction and implementation, resulting in increased programming productivity. This freedom also enables people with no prior computer experience to write their own programs with little training.

DEFINITIONS

It is desired to set out certain definitions of the terms used in this description and in the appended claims.

SOURCE PROGRAM—a computer program which must undergo a compilation or an assembly process to be in a form that is executable by a computer. It can be in a symbolic language as written by a programmer, or in the form of external storage such as a deck of cards, or in some coded form in computer storage.

OBJECT PROGRAM—a computer program which is a representation of a source program in computer executable form. It can be in the form of external storage such as a deck of cards or in computer storage.

COMPILER—a computer program for converting a source program into an object program.

FORMULA—either a single or a set of instruction steps such as add, multiply, compare, retrieve from storage, etc., which represents a function to be performed by a computer as part of a computer program.

FORMULA DEFINED—either
 (a) if the result of any other formula is not required for the computer to perform the function of the formula, or
 (b) if such result is required, the required formula has itself already been defined.

FORMULA UNDEFINED—if the result of any other formula is required for the computer to perform the function of the formula and the required formula has not itself been defined.

We claim:

1. A process of operating a general purpose data processor of known type to enable the data processor to execute formulas in an object program comprising a plurality of formulas, such that the same results will be produced when using the same given data, regardless of the sequence in which said formulas are presented in said object program, comprising the steps of:
 (a) examining each of said formulas in a storage area of the data processor to determine which formulas can be designated as defined;
 (b) storing, in the sequence in which each formula is designated as defined, said formulas which are designated as defined;
 (c) repeating steps (a) and (b) for at least undefined formulas as many times as required until all said formulas have been designated as defined and have been stored;
 whereby to produce the same results upon sequential execution of the formulas stored by said process when using the same given data, regardless of the order in which said formulas were presented in the object program prior to said process.

2. A process of operating a general purpose data processor of known type to enable the data processor to execute formulas in an object program comprising a plurality of formulas, such that the same results will be produced when using the same given data, regardless of the sequence in which said formulas are presented in said object program, comprising the steps of:
 (a) examining each of said formulas in a storage area of the data processor to determine which formulas require the results of other formulas; and
 (b) storing said formulas in a sequence such that when the said stored formulas are executed in the sequence in which stored, those formulas requiring the results of other formulas will be executed subsequent to the formulas whose results they require;
 whereby to produce the same results upon sequential execution of the formulas stored by said process when using the same given data, regardless of the order in which said formulas were presented in the object program prior to said process.

3. A process of operating a general purpose data processor of known type to enable the data processor to execute formulas in an object program comprising a plurality of formulas, such that the same results will be produced when using the same given data, regardless of the sequence in which said formulas are presented in said object program, comprising the steps of:
 (a) examining each of said formulas in a storage area of the data processor to determine which formulas can be designated as defined;
 (b) storing an indication of the order in which each formula is designated as defined;
 (c) repeating steps (a) and (b) for at least undefined formulas as many times as required until all said formulas have been designated as defined and an indication of the order in which said formulas were designated as defined has been stored;
 whereby to produce the same results upon execution of the formulas according to the stored indicated order recited in step (b) when using the same given data, regardless of the order in which said formulas were presented in the object program prior to said process.

4. A process of operating a general purpose data processor of known type to enable the data processor to execute formulas in an object program comprising a plurality of formulas, such that the same results will be produced when using the same given data, regardless of the sequence in which said formulas are presented in said object program, comprising the steps of:

(a) examining each of said formulas in a storage area of the data processor to determine which formulas require the results of other formulas;

(b) storing an indication of the order of execution of said formulas in a sequence such that when the said formulas are executed in the sequence of the stored indicated order of execution those formulas requiring the results of other formulas will be executed subsequent to the formulas whose results they require;

whereby to produce the same results upon execution of the formulas according to the stored indicated order recited in step (b) when using the same given data, regardless of the order in which said formulas were presented in the object program prior to said process.

5. A process of operating a general purpose data processor of known type to enable the data processor to execute formulas in an object program comprising a plurality of formulas, such that the same results will be produced when using the same given data, regardless of the sequence in which said formulas are presented in said object program, comprising the steps of:

(a) examining each of said formulas in a storage area of the data processor to determine which formulas can be designated as defined;

(b) executing, in the sequence in which each formula is designated as defined, said formulas designated as defined;

(c) repeating steps (a) and (b) for at least undefined formulas as many times as required until all said formulas have been designated as defined and have been executed;

whereby to produce the same results upon execution of the formulas in the sequence recited in step (b) when using the same given data, regardless of the order in which said formulas were presented in the object program prior to said process.

6. A process of operating a general purpose data processor of known type to enable the data processor to execute formulas in an object program comprising a plurality of formulas, such that the same results will be produced when using the same given data, regardless of the sequence in which said formulas are presented in said object program, comprising the steps of:

(a) examining each of said formulas in a storage area of the data processor to determine which formulas require the results of other formulas;

(b) executing said formulas in a sequence such that those formulas requiring the results of other formulas will be executed subsequent to the formulas whoe results they require;

whereby to produce the same results upon execution of the formulas in the sequence recited in step (b) when using the same given data, regardless of the order in which said formulas were presented in the object program prior to said process.

7. A process of operating a general purpose data processor of known type to enable to data processor to compile a source program comprising a plurality of formulas into an object program such that the same results will be produced upon execution of the object program when using the same given data regardless of the order in which said formulas are presented in the said source program, comprising the steps of:

(a) examining each of said formulas in a storage area of the data processor to determine which formulas can be designated as defined;

(b) compiling said formulas designated as defined in the sequence in which each formula is designated as defined;

(c) repeating steps (a) and (b) for at least undefined formulas as many times as required until all said formulas have been designated as defined and have been compiled into an object program;

whereby the same results will be produced upon execution of the said object program when using the same given data regardless of the order in which said formulas are presented in the said source program.

8. A process of operating a general purpose data processor of known type to enable the data processor to compile a source program comprising a plurality of formulas into an object program, such that the same results will be produced upon execution of the object program when using the same given data regardless of the order in which said formulas are presented in the said source program, comprising the steps of:

(a) examining each of said formulas in a storage area of the data processor to determine which formulas require the results of other formulas;

(b) compiling said formulas such that those formulas requiring the results of other formulas will be compiled subsequent to the formulas whose results they require;

whereby the same results will be produced upon execution of the said object program when using the same given data regardless of the order in which said formulas are presented in said source program.

9. A process of operating a general purpose data processor of known type to enable the data processor to compile a source program comprising a plurality of formulas into an object program, such that the same results will be produced upon execution of the object program when using the same given data regardless of the order in which said formulas are presented in the same source program, comprising the step of:

(a) examining each of said formulas in a storage area of the data processor to determine which formulas can be designated as defined;

(b) storing an indication of the order in which each formula is designated as defined;

(c) repeating steps (a) and (b) for at least undefined formulas as many times as required until all said formulas have been designated as defined and an indication of the order in which said formulas were designated as defined has been stored;

whereby upon compilation of said formulas into an object program according to the stored indicated order recited in step (b) the same results will be produced upon execution of the said object program when using the same given data regardless of the order in which said formulas are presented in the said source program.

10. A process of operating a general purpose data processor of known type to enable the data processor to compile a source program comprising a plurality of formulas into an object program such that the same results will be produced upon execution of the object program when using the same given data regardless of the order in which said formulas are presented in the said source program, comprising the steps of:

(a) examining each of said formulas in a storage area of the data processor to determine which formulas require the results of other formulas;

(b) storing in a sequence an indication of the order in which said formulas are to be compiled such that when the said formulas are compiled in the sequence of the stored indicated order those formulas requiring the results of other formulas will be compiled subsequent to the formulas whose results they require;

whereby upon compilation of said formulas into an object program according to the stored indicated order recited in step (b) the same results will be produced upon execution of the said object program when using the same given data regardless of the order in which said formulas are presented in the said source program.

11. A process of operating a general purpose data processor of known type to enable the data processor to execute an object program compiled from a source program comprising a plurality of formulas such that the same results will be produced upon execution of the object program when using the same given data regardless of the order in which said formulas are presented in said source program comprising the steps of:

(a) examining each of said formulas in a storage area of the data processor to determine which formulas can be designated as defined;

(b) storing an indication of the order in which each formula is designated as defined;

(c) repeating steps (a) and (b) for at least undefined formulas as many times as required until all said formulas have been designated as defined and an indication of the order in which said formulas were designated as defined has been stored;

whereby to produce the same results upon execution of the compiled formulas according to the stored indicated order recited in step (b) when using the same given data regardless of the order in which said formulas are presented in said source program.

12. A process of operating a general purpose data processor of known type to enable the data processor to execute an object program compiled from a source program comprising a plurality of formulas such that the same results will be produced upon execution of the object program when using the same given data regardless of the order in which said formulas are presented in said source program comprising the steps of:

(a) examining each of said formulas in a storage area of the data processor to determine which formulas require the results of other formulas;

(b) storing in a sequence an indication of the order in which said formulas are to be executed after compilation such that when the compiled formulas are executed in the sequence of the stored indicated order those compiled formulas requiring the results of other formulas will be executed subsequent to the compiled formulas whose results they require;

whereby to produce the same results upon execution of the compiled formulas according to the stored indicated order recited in step (b) when using the same given data regardless of the order in which said formulas are presented in said source program.

13. A process of operating a general purpose data processor of known type to enable the data processor to compile and execute formulas in a source program comprising a plurality of formulas such that the same results will be produced when using the same given data regardless of the order in which said formulas are presented in the said source program comprising the steps of:

(a) examining each of said formulas in a storage area of the data processor to determine which formulas can be designated as defined;

(b) compiling and executing in the sequence in which each source formula is designated as defined said formulas which are designated as defined;

(c) repeating steps (a) and (b) for at least undefined formulas as many times as required until all said formulas have been compiled and executed;

whereby the same results will be produced upon compilation and execution of the formulas according to the sequence recited in step (b) when using the same given data regardless of the order in which the source formulas are presented in said source program.

14. A process of operating a general purpose data processor of known type to enable the data processor to compile and execute formulas in a source program comprising a plurality of formulas such that the same results will be produced when using the same given data regardless of the order in which said formulas are presented in the said source program comprising the steps of:

(a) examining each of said formulas in a storage area of the data processor to determine which formulas require the results of other formulas;

(b) compiling and executing said formulas such that those formulas requiring the results of other formulas will be compiled and executed subsequent to the formulas whose results they require;

whereby the same results will be produced upon compilation and execution of the formulas according to the sequence recited in step (b) when using the same given data regardless of the order in which the source formulas are presented in said source program.

15. A process of operating a general purpose data processor of known type to enable the data processor to compile and execute formulas in a source program comprising a plurality of formulas such that the same results will be produced when using the same given data regardless of the order in which said formulas are presented in the said source program comprising the steps of:

(a) examining each of said formulas in a storage area of the data processor to determine which formulas can be designated as defined;

(b) storing, in the sequence in which each formula is designated as defined, said formulas which are designated as defined;

(c) repeating steps (a) and (b) for at least undefined formulas as many times as required until all said formulas have been designated as defined and have been stored;

whereby the same results will be produced upon compilation and execution of the formulas stored by said process when using the same given data regardless of the order in which the source formulas are presented in said source program prior to said process.

16. A process of operating a general purpose data processor of known type to enable the data processor to compile and execute formulas in a source program comprising a plurality of formulas such that the same results will be produced when using the same given data regardless of the order in which said formulas are presented in the said source program comprising the steps of:

(a) examining each of said formulas in a storage area of the data processor to determine which formulas require the results of other formulas;

(b) storing said formulas in a sequence such that when the said stored formulas are compiled and executed in the sequence in which stored those formulas requiring the results of other formulas will be compiled and executed subsequent to the formulas whose results they require;

whereby the same results will be produced upon compilation and execution of the formulas stored by said process when using the same given data regardless of the order in which the source formulas are presented in said source program prior to said process.

17. A process of operating a general purpose data processor of known type to enable the data processor to compile and execute formulas in a source program comprising a plurality of formulas such that the same results will be produced when using the same given data regardless of the order in which said formulas are presented in the said source program comprising the steps of:

(a) examining each of said formulas in a storage area of the data processor to determine which formulas can be designated as defined;

(b) storing an indication of the order in which each formula is designated as defined;

(c) repeating steps (a) and (b) for at least undefined formulas as many times as required until all said formulas have been designated as defined and an indication of the order in which said formulas were designated as defined has been stored;

whereby the same results will be produced upon compilation and execution of the formulas according to the stored indicated order recited in step (b) when using the same given data regardless of the order in which the source formulas are presented in said source program.

18. A process of operating a general purpose data processor of known type to enable the data processor to compile and execute formulas in a source program comprising a plurality of formulas such that the same results will be produced when using the same given data regardless of the order in which said formulas are presented in the said source program comprising the steps of:

(a) examining each of said formulas in a storage area of the data processor to determine which formulas require the results of other formulas;

(b) storing an indication of the order of compilation and execution of said formulas in a sequence such that when said formulas are compiled and executed in the sequence of the stored indicated order of compilation and execution those formulas requiring the results of other formulas will be compiled and executed subsequent to the formulas whose results they require;

whereby the same results will be produced upon compilation and execution of the formulas according to the sequence of the stored indicated order recited in step (b) when using the same given data regardless of the order in which the source formulas are presented in said source program.

19. A general purpose data processor of known type operating under the control of a stored program containing a set of instructions for enabling the data processor to execute formulas in an object program comprising a plurality of formulas, such that the same results will be produced when using the same given data, regardless of the sequence in which said formulas are presented in said object program, said data processor performing the following functions:

(a) examining each of said formulas in a storage area of the data processor to determine which formulas can be designated as defined;

(b) storing, in the sequence in which each formula is designated as defined, said formulas which are designated as defined;

(c) repeating steps (a) and (b) for at least undefined formulas as many times as required until all said formulas have been designated as defined and have been stored;

whereby to produce the same results upon sequential execution of the formulas stored by said functions when using the same given data, regardless of the order in which said formulas were presented in the object program prior to said functions.

20. A general purpose data processor of known type operating under the control of a stored program containing a set of instructions for enabling the data processor to execute formulas in an object program comprising a plurality of formulas, such that the same results will be produced when using the same given data, regardless of the sequence in which said formulas are presented in said object program, said data processor performing the following functions:

(a) examining each of said formulas in a storage area of the data processor to determine which formulas require the results of other formulas;

(b) storing said formulas in a sequence such that when the said stored formulas are executed in the sequence in which stored, those formulas requiring the results of other formulas will be executed subsequent to the formulas whose results they require;

whereby to produce the same results upon sequential execution of the formulas stored by said functions when using the same given data, regardless of the order in which said formulas were presented in the object program prior to said functions.

21. A general purpose data processor of known type operating under the control of a stored program containing a set of instructions for enabling the data processor to execute formulas in an object program comprising a plurality of formulas, such that the same results will be produced when using the same given data, regardless of the sequence in which said formulas are presented in said object program, said data processor performing the following functions:

(a) examining each of said formulas in a storage area of the data processor to determine which formulas can be designated as defined;

(b) storing an indication of the order in which each formula is designated as defined;

(c) repeating steps (a) and (b) for at least undefined formulas as many times as required until all said formulas have been designated as defined and an indication of the order in which said formulas were designated as defined has been stored;

whereby to produce the same results upon execution of the formulas according to the stored indicated order recited in step (b) when using the same given data, regardless of the order in which said formulas were presented in the object program prior to said functions.

22. A general purpose data processor of known type operating under the control of a stored program containing a set of instructions for enabling the data processor to execute formulas in an object program comprising a plurality of formulas, such that the same results will be produced when using the same given data, regardless of the sequence in which said formulas are presented in said object program, said data processor performing the following functions:
  (a) examining each of said formulas in a storage area of the data processor to determine which formulas require the results of other formulas;
  (b) storing an indication of the order of execution of said formulas in a sequence such that when the said formulas are executed in the sequence of the stored indicated order of execution those formulas requiring the results of other formulas will be executed subsequent to the formulas whose results they require;
  whereby to produce the same results upon execution of the formulas according to the stored indicated order recited in step (b) when using the same given data, regardless of the order in which said formulas were presented in the object program prior to said functions.

23. A general purpose data processor of known type operating under the control of a stored program containing a set of instructions for enabling the data processor to execute formulas in an object program comprising a plurality of formulas, such that the same results will be produced when using the same given data, regardless of the sequence in which said formulas are presented in said object program, said data processor performing the following functions:
  (a) examining each of said formulas in a storage area of the data processor to determine which formulas can be designated as defined;
  (b) executing, in the sequence in which each formula is designated as defined, said formulas designated as defined;
  (c) repeating steps (a) and (b) for at least undefined formulas as many times as required until all said formulas have been designated as defined and have been executed;
  whereby to produce the same results upon execution of the formulas in the sequence recited in step (b) when using the same given data, regardless of the order in which said formulas were presented in the object program prior to said functions.

24. A general purpose data processor of known type operating under the control of a stored program containing a set of instructions for enabling the data processor to execute formulas in an object program comprising a plurality of formulas, such that the same results will be produced when using the same given data, regardless of the sequence in which said formulas are presented in said object program, said data processor performing the following functions:
  (a) examining each of said formulas in a storage area of the data processor to determine which formulas require the results of other formulas;
  (b) executing said formulas in a sequence such that those formulas requiring the results of other formulas will be executed subsequent to the formulas whose results they require;
  whereby to produce the same results upon execution of the formulas in the sequence recited in step (b) when using the same given data, regardless of the order in which said formulas were presented in the object program prior to said functions.

25. A general purpose data processor of known type operating under the control of a stored program containing a set of instructions for enabling the data processor to compile a source program comprising a plurality of formulas into an object program such that the same results will be produced upon execution of the object program when using the same given data regardless of the order in which said formulas are presented in the said source program, said data processor performing the following functions:
  (a) examining each of said formulas in a storage area of the data processor to determine which formulas can be designated as defined;
  (b) compiling said formulas designated as defined in the sequence in which each formula is designated as defined;
  (c) repeating steps (a) and (b) for at least undefined formulas as many times as required until all said formulas have been designated as defined and have been compiled into an object program;
  whereby the same results will be produced upon execution of the said object program when using the same given data regardless of the order in which said formulas are presented in the said source program.

26. A general purpose data processor of known type operating under the control of a stored program containing a set of instructions for enabling the data processor to compile a source program comprising a plurality of formulas into an object program such that the same results will be produced upon execution of the object program when using the same given data regardless of the order in which said formulas are presented in the said source program, said data processor performing the following functions:
  (a) examining each of said formulas in a storage area of the data processor to determine which formulas require the results of other formulas;
  (b) compiling said formulas such that those formulas requiring the results of other formulas will be compiled subsequent to the formulas whose results they require;
  whereby the same results will be produced upon execution of the said object program when using the same given data regardless of the order in which said formulas are presented in said source program.

27. A general purpose data processor of known type operating under the control of a stored program containing a set of instructions for enabling the data processor to compile a source program comprising a plurality of formulas into an object program such that the same results will be produced upon execution of the object program when using the same given data regardless of the order in which said formulas are presented in the said source program, said data processor performing the following functions:
  (a) examining each of said formulas in a storage area of the data processor to determine which formulas can be designated as defined;
  (b) storing an indication of the order in which each formula is designated as defined;
  (c) repeating steps (a) and (b) for at least undefined formulas as many times as required until all said formulas have been designated as defined and an indication of the order in which said formulas were designated as defined has been stored;

whereby upon compilation of said formulas into an object program according to the stored indicated order recited in step (b) the same results will be produced upon execution of the said object program when using the same given data regardless of the order in which said formulas are presented in the said source program.

28. A general purpose data processor of known type operating under the control of a stored program containing a set of instructions for enabling the data processor to compile a source program comprising a plurality of formulas into an object program such that the same results will be produced upon execution of the object program when using the same given data regardless of the order in which said formulas are presented in the said source program, said data processor performing the following functions:

(a) examining each of said formulas in a storage area of the data processor to determine which formulas require the results of other formulas;

(b) storing in a sequence an indication of the order in which said formulas are to be compiled such that when the said formulas are compiled in the sequence of the stored indicated order those formulas requiring the results of other formulas will be compiled subsequent to the formulas whose results they require;

whereby upon compilation of said formulas into an object program according to the stored indicated order recited in step (b) the same results will be produced upon execution of the said object program when using the same given data regardless of the order in which said formulas are presented in the said source program.

29. A general purpose data processor of known type operating under the control of a stored program containing a set of instructions for enabling the data processor to execute an object program compiled from a source program comprising a plurality of formulas such that the same results will be produced upon execution of the object program when using the same given data regardless of the order in which said formulas are presented in said source program, said data processor performing the following functions:

(a) examining each of said formulas in a storage area of the data processor to determine which formulas can be designated as defined;

(b) storing an indication of the order in which each formula is designated as defined;

(c) repeating steps (a) and (b) for at least undefined formulas as many times as required until all said formulas have been designated as defined and an indication of the order in which said formulas were designated as defined has been stored;

whereby to produce the same results upon execution of the compiled formulas according to the stored indicated order recited in step (b) when using the same given data regardless of the order in which said formulas are presented in said source program.

30. A general purpose data processor of known type operating under the control of a stored program containing a set of instructions for enabling the data processor to execute an object program compiled from a source program comprising a plurality of formulas such that the same results will be produced upon execution of the object program when using the same given data regardless of the order in which said formulas are presented in said source program, said data processor performing the following functions:

(a) examining each of said formulas in a storage area of the data processor to determine which formulas require the results of other formulas;

(b) storing in a sequence an indication of the order in which said formulas are to be executed after compilation such that when the compiled formulas are executed in the sequence of the stored indicated order those compiled formulas requiring the results of other formulas will be executed subsequent to the compiled formulas whose results they require;

whereby to produce the same results upon execution of the compiled formulas according to the stored indicated order recited in step (b) when using the same given data regardless of the order in which said formulas are presented in said source program.

31. A general purpose data processor of known type operating under the control of a stored program containing a set of instructions for enabling the data processor to compile and execute formulas in a source program comprising a plurality of formulas such that the same results will be produced when using the same given data regardless of the order in which said formulas are presented in the said source program, said data processor performing the following functions:

(a) examining each of said formulas in a storage area of the data processor to determine which formulas can be designated as defined;

(b) compiling and executing in the sequence in which each source formula is designated as defined said formulas which are designated as defined;

(c) repeating steps (a) and (b) for at least undefined formulas as many times as required until all said formulas have been compiled and executed;

whereby the same results will be produced upon compilation and execution of the formulas according to the sequence recited in step (b) when using the same given data regardless of the order in which the source formulas are presented in said source program.

32. A general purpose data processor of known type operating under the control of a stored program containing a set of instructions for enabling the data processor to compile and execute formulas in a source program comprising a plurality of formulas such that the same results will be produced when using the same given data regardless of the order in which said formulas are presented in the said source program, said data processor performing the following functions:

(a) examining each of said formulas in a storage area of the data processor to determine which formulas require the results of other formulas;

(b) compiling and executing said formulas such that those formulas requiring the results of other formulas will be compiled and executed subsequent to the formulas whose results they require;

whereby the same results will be produced upon compilation and execution of the formulas according to the sequence recited in step (b) when using the same given data regardless of the order in which the source formulas are presented in said source program.

33. A general purpose data processor of known type operating under the control of a stored program containing a set of instructions for enabling the data processor to compile and execute formulas in a source program comprising a plurality of formulas such that the same results will be produced when using the same given data regardless of the order in which said formulas are presented in the said source program, said data processor performing the following functions:
  (a) examining each of said formulas in a storage area of the data processor to determine which formulas can be designated as defined;
  (b) storing, in the sequence in which each formula is designated as defined, said formulas which are designated as defined;
  (c) repeating steps (a) and (b) for at least undefined formulas as many times as required until all said formulas have been designated as defined and have been stored;
  whereby the same results will be produced upon compilation and execution of the formulas stored by said process when using the same given data regardless of the order in which the source formulas are presented in said source program prior to said functions.

34. A general purpose data processor of known type operating under the control of a stored program containing a set of instructions for enabling the data processor to compile and execute formulas in a source program comprising a plurality of formulas such that the same results will be produced when using the same given data regardless of the order in which said formulas are presented in the said source program, said data processor performing the following functions:
  (a) examining each of said formulas in a storage area of the data processor to determine which formulas require the results of other formulas;
  (b) storing said formulas in a sequence such that when the said stored formulas are compiled and executed in the sequence in which stored those formulas requiring the results of other formulas will be compiled and executed subsequent to the formulas whose results they require;
  whereby the same results will be produced upon compilation and execution of the formulas stored by said functions when using the same given data regardless of the order in which the source formulas are presented in said source program prior to said function.

35. A general purpose data processor of known type operating under the control of a stored program containing a set of instructions for enabling the data processor to compile and execute formulas in a source program comprising a plurality of formulas such that the same results will be produced when using the same given data regardless of the order in which said formulas are presented in the said source program, said data processor performing the following functions:
  (a) examining each of said formulas in a storage area of the data processor to determine which formulas can be designated as defined;
  (b) storing an indication of the order in which each formula is designated as defined;
  (c) repeating steps (a) and (b) for at least undefined formulas as many times as required until all said formulas have been designated as defined and an indication of the order in which said formulas were designated as defined has been stored;
  whereby the same results will be produced upon compilation and execution of the formulas according to the stored indicated order recited in step (b) when using the same given data regardless of the order in which the source formulas are presented in said source program.

36. A general purpose data processor of known type operating under the control of a stored program containing a set of instructions for enabling the data processor to compile and execute formulas in a source program comprising a plurality of formulas such that the same results will be produced when using the same given data regardless of the order in which said formulas are presented in the said source program, said data processor performing the following functions:
  (a) examining each of said formulas in a storage area of the data processor to determine which formulas require the results of other formulas;
  (b) storing an indication of the order of compilation and execution of said formulas in a sequence such that when said formulas are compiled and executed in the sequence of the stored indicated order of compilation and execution those formulas requiring the results of other formulas will be compiled and executed subsequent to the formulas whose results they require;
  whereby the same results will be produce upon compilation and execution of the formulas according to the sequence of the stored indicated order recited in step (b) when using the same given data regardless of the order in which the source formulas are presented in said source program.

* * * * *